United States Patent Office 3,503,957
Patented Mar. 31, 1970

3,503,957
6-AMINOALKYL MORPHANTHRIDINE DERIVATIVES
Alexander E. Drukker, Milwaukee, and Claude I. Judd, Mequon, Wis., assignors to Colgate-Palmolive Company, New York, N.Y., a corporation of Delaware
No Drawing. Continuation-in-part of application Ser. No. 430,754, Feb. 5, 1965. This application May 9, 1967, Ser. No. 637,099
Int. Cl. C07d 41/00; A61k 27/00
U.S. Cl. 260—239                5 Claims

ABSTRACT OF THE DISCLOSURE

The compounds are 6-aminoalkyl morphanthridines which are useful as pharmaceutical agents, especially anti-tremorine or anti-Parkinsonism type agents. A species disclosed is 6-(3-N-methylamino-1-propyl)morphanthridine.

---

This application is a continuation-in-part of our copending application Ser. No. 430,754 filed Feb. 5, 1965.

BRIEF SUMMARY OF THE INVENTION

The invention relates to 6-aminoalkyl morphanthridines which possess pharmacological activity and pharmaceutical compositions and methods employing them.

DETAILED DESCRIPTION OF THE INVENTION

The 6-aminoalkyl morphanthridines have the following formula:

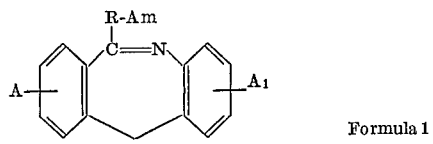

Formula 1 wherein A and $A_1$ are hydrogen, a halo group such as the chloro and bromo, a lower alkoxy such as methoxy and ethoxy, a lower alkyl of 1 to 4 carbon atoms, a lower alkyl-thio such as thiomethyl and thioethyl and trifluoromethyl; R is a lower alkylene of from 1 to 8 carbon atoms such as methylene, ethylene, isopropylene and butylene; and Am represents the group

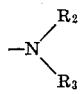

wherein $R_2$ and $R_3$ are the same or different groups including hydrogen, a lower alkyl such as methyl, ethyl, propyl, isopropyl or butyl, a lower alkenyl of 3 to 6 carbon atoms such as allyl, phenyl including a nuclear-substituted phenyl such as p-chlorophenyl and p-methoxyphenyl, an aralkyl such as benzyl, phenethyl, phenylisopropyl, diphenyl methyl, a cycloalkyl, particularly cycloalkyl groups having from 5 to 7 carbon atoms such as cyclopentyl, cyclohexyl, a cycloalkyl-lower alkyl such as cyclohexylmethyl or cyclopentyl-ethyl and groups in which

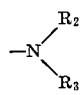

represents a group such as morpholino, pyrrolidino, piperidino, piperazino, 1,2,3,4-tetrahydroquinolino, 4-lower alkyl piperazino such as 4-methylpiperazino, 4-(phenyl-lower alkyl)-piperazino such as 4-benzyl-piperazino and 4-(alpha-methylphenethyl)-piperazino and 4-(hydroxy-lower alkyl)-piperazino such as 4-(2-hydroxy-1-ethyl)piperazino.

The compounds of Formula 1 may be prepared by reacting a 5,6-dihydro-6-morphanthridone with phosphorus pentachloride to form a 6-chloromorphanthridine which on treatment with a reagent generated from a tertiary aminoalkyl halide, followed by neutralization yields a 6-aminoalkyl morphanthridine. This process can be represented as follows:

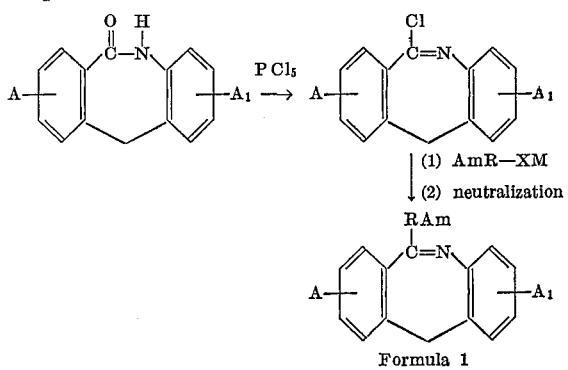

Formula 1 wherein the group XM is lithium or a compound in which X is a halogen such as chlorine, bromine or iodine; and M is a reactive metal such as magnesium; A, $A_1$, R and Am have the significance previously assigned, but Am is not a primary or secondary amino group.

Examples of some of the 5,6-dihydro-6-morphanthridones which may be employed in this process are:

5,6-dihydro-6-morphanthridone,
2-chloro-5,6-dihydro-6-morphanthridone,
2-trifluoromethyl-5,6-dihydro-6-morphanthridone, and
3-methyl-5,6-dihydro-6-morphanthridone.

The 5,6-dihydro-6-morphanthridones may be prepared according to the procedures described in United States Patent 2,973,354.

The 6-halomorphanthridines are prepared by treating a 5,6-dihydro-6-morphanthridone with phosphorus pentachloride. Examples of some of the 6-chloromorphanthridines which may be prepared are:

6-chloromorphanthridine,
2,6-dichloromorphanthridine,
2-trifluoromethyl-6-chloromorphanthridine, and
3-methyl-6-chloromorphanthridine.

Representative of the disubstituted aminoalkyl metal halides or lithium aminoalkyls which can be used in this process are:

dimethylaminopropyl magnesium chloride,
diethylaminobutyl magnesium bromide,
dibenzylaminopropyl lithium,
diallylaminopropyl magnesium chloride,
N-methyl-N-benzylaminopropyl magnesium chloride,
diphenylaminopropyl magnesium chloride,
pyrrolidinobutyl magnesium chloride,
homopiperidinopropyl magnesium chloride,
piperidinopropyl magnesium chloride, and
4-methylpiperazinopropyl magnesium chloride.

The disubstituted aminoalkyl metal halides which may be used in the first step of this process are Grignard reagents which may be prepared by conventional methods such as those disclosed in United States Patent 2,996,503 and German Patent 1,109,166.

The reaction between a aminoalkyl metal halide or a lithium aminoalkyl compound and a 6-halo morphanthridine is conveniently effected by bringing the reactants together in admixture in an inert solvent under anhydrous conditions. Suitable solvents are anhydrous ether such as ethyl ether, tetrahydrofuran or ethyl ether with benzene.

After the reactants have been brought together the reaction may be allowed to proceed at room temperature, or if desired, can be heated at temperatures up to the reflux temperature in order to promote the reaction. After the reaction is substantially completed the complex is hydrolyzed by the addition of an ammonium chloride solution and the inorganic solids separated by filtration. The resulting product can then be isolated from the mixture by conventional techniques, such as by evaporating the solvent. The product can, if desired, then be recrystallized from a suitable medium such as benzene.

Examples of some of the 6-amino alkyl morphanthridines which may be prepared employing the process identified above are:

6-(3-dimethylamino-1-propyl) morphanthridine,
2-chloro-6-(3-dimethylamino-1-propyl) morphanthridine,
6-(2-diethylamino-1-propyl) morphanthridine,
2-chloro-6-(3-dimethylamino-2-methyl-1-propyl) morphanthridine,
6-(diallylamino-1-propyl) morphanthridine,
6-(3-dibenzylamino-1-propyl) morphanthridine,
6-(3-piperidino-1-propyl) morphanthridine, Compounds of Formula 1 wherein Am is

and $R_2$ and/or $R_3$ is a benzyl group can be converted to the corresponding compounds in which $R_2$ and/or $R_3$ is hydrogen by debenzylation using a chloroformic acid ester or chlorothioformic acid ester to form an intermediate carbamate which is in turn hydrolyzed to cleave the acyloxy group. This process can be represented as follows:

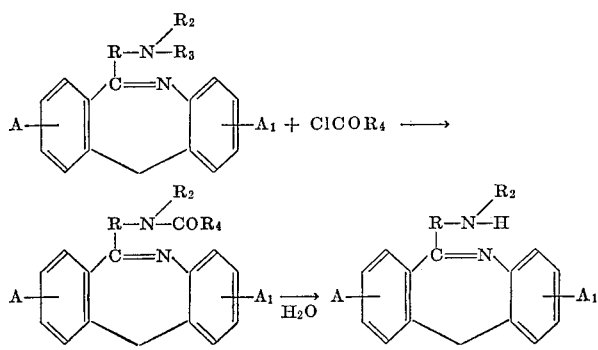

wherein A, $A_1$ and R have the assigned meaning; $R_2$ has the assigned meaning but is not benzyl; and $R_4$ is a lower alkoxy such as methoxy and ethoxy, a lower thioalkyl such as thiomethyl, thioethyl and thiopropyl, phenoxy and thiophenyl.

Among the chloroformates which can be used in the process are methyl chloroformate, ethyl chloroformate, phenyl chloroformate, methyl thiochloroformate, ethyl thichloroformate and phenyl thiochloroformate.

The debenzylation reaction is readily effected by bringing the reactants together in a suitable inert solvent at from about room temperature to about 200° C. Benzene is a particularly useful reaction medium and with it a reaction temperature of about 80° C. is suitable. Preferably the reaction mixture is refluxed for about 5 to 20 hours before the reaction is terminated. The intermediate carbamate may then be isolated from the reaction mixture by conventional methods.

Some of the novel carbamates which may be formed in this manner are:

6-[3-(N-methyl-N-carbomethoxyamino)propyl]morphanthridine,
6-[3-(N-ethyl-N-carbomethoxyamino)propyl]morphanthridine,
6-[3-(N methyl-N-carboethoxyamino)propyl]morphanthridine.

The carboxy group can be cleaved by acid or base hydrolysis and preferably with a base such as barium, calcium, lithium, sodium or potassium hydroxide, or an acid such as acetic acid, hydrobromic acid, hydrochloric acid or p-toluenesulfuric acid. The rate of hydrolysis is increased by heating the hydrolysis mixture, such as at reflux. Following the hydrolysis the reaction mixture can be neutralized and the product extracted.

The compounds of this invention form water soluble acid addition salts with inorganic or organic acids such as hydrochloric acid, hydrobromic acid, sulfuric acid, phosphoric acid, methane sulfonic acid, ethane sulfonic acid, acetic acid, nitric acid, maleic acid, succinic acid, tartaric acid, benzoic acid, phthalic acid and cyclohexylsulfamic acid. They also form quaternary ammonium salts with compounds such as methyl chloride and ethyl bromide.

The compounds of Formula I and their pharmaceutically acceptable salts possess the ability to block Parkinsonism-type tremors. For example, premedication of mice with 20 mg./kg. doses of 6-[3-(N-methylamino)-1-propyl]morphanthridine, 6-(3-dimethylamino-1-propyl)morphanthridine or 6 - [3-(N-methyl-N-benzylamine)-1-propyl]morphanthridine was effective in inhibiting the tremors normally induced by the administration of tremorine. In addition, this test demonstrates the anti-cholinergic action of the compounds. The compound 6-[3-(N-methyl-N-benzylamino)propyl]morphanthridine was also effective in reducing the isolation-induced aggressive antisocial behavior in mice when administered in doses of approximately 30 mg./kg.

The compounds are preferably combined with a major portion of suitable pharmaceutical diluents and formed into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as ethylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin and disintegrating agents such as sodium carbonate in combination with citric acid may be employed in the formation of the tablets.

Unit dosage forms, such as tablets and capsules, may contain any suitable predetermined amount of one or more of the active ingredients as a nontoxic acid addition salt and may be administered one or more at a time at regular intervals. Such unit dosage forms, however, should generally contain a concentration of 0.1% to 10% by weight of one or more of the active agents. Such unit dosage forms should advisably contain about 5 to 150 mgm. of the active ingredients.

The following examples are presented to illustrate this invention:

EXAMPLE I

6-chloromorphanthridine

A mixture of 20.9 g. (0.1 mole) of 5,6-dihydro-6-morphanthridone and 29 g. phosphoric pentachloride is heated in a 130° oil bath for 2 hours. When the mixture becomes liquid, hydrochloric acid escapes and phosphorus oxychloride begins to reflux. The phosphorus oxychloride which forms and the excess phosphoric pentachloride are distilled off at 18 mm. and the residue is fractionated through a short column to give a crude 6-chloromorphanthridone, B.P. 162° (0.2 mm.). A small amount is refractionated and a fraction obtained of 6-chloromorphanthridine, B.P. 132° (0.025 mm.).

*Analysis.*—Calcd. for $C_{14}H_{10}ClN$ (percent): C, 73.85;

H, 4.43; N, 6.15; Cl, 15.57. Found (percent): C, 73.64; H, 4.39; N, 6.18; Cl, 15.65.

EXAMPLE II

6-(3-dimethylamino-1-propyl)morphanthridine

To the Grignard reagent, prepared from 27.9 g. (0.23 mole) 3-dimenthylaminopropylchloride and 5.6 g. magnesium in 200 ml. of tetrahydrofuran (T.H.F.) is added a solution of 25.8 g. (0.116 mole) of 6-chloromorphanthridine in 200 ml. of T.H.F. in 40 minutes. After stirring at room temperature for 18 hours the addition product is decomposed by dropwise addition of 24 ml. ammonium chloride solution. The inorganic precipitate is removed by filtration, taken to dryness and the residue is taken up in ether-chloroform. The organic layer is extracted with 1 N. hydrochloric acid, and the aqueous extracts are made alkaline in ether, dried over potassium carbonate and taken to dryness to give an oil. This oil is distilled to give 6-(3-dimethylamino-1-propyl) morphanthridine which is a viscous yellow oil, B.P. 150–165° (0.1–0.2 mm.).

Analysis.—Calcd. for $C_{19}H_{22}N_2$ (percent): N, 10.06. Found (percent): N, 9.78.

The oxalate salt is prepared by adding a solution of 1.51 g. oxalic acid 2 aq. in 15 ml. alcohol to a solution of 3.3 g. base in 25 ml. alcohol followed by the addition of 60 ml. dry ether. A crystalline salt is filtered off and recrystallized from ethanol, to give the corresponding exalate, M.P. 161° (dec.).

Analysis.—Calcd. for $C_{21}H_{24}N_2O_4$ (percent): C, 68.46; H, 6.57; N, 7.60. Found (percent): C, 68.24; H, 6.49; N, 7.68.

EXAMPLE III

6-[3-(N-methyl-N-benzylamino)-1-propyl]morphanthridine

A mixture of 5.6 g. (0.23 At) magnesium, 100 ml. tetrahydrofuran and 0.2 g. calcium hydride is refluxed for ten minutes until the mixture turns grey. Over a half hour period 45.4 g. (0.23 mole) of 3-(N-methyl-N-benzyl)-1-chloropropane in 100 ml. tetrahydrofuran is added dropwise and refluxed one and a half hours. The flask is cooled and over a one and a half hour period 25.8 g. (0.12 mole) of 6-chloromorphanthridine in 200 ml. tetrahydrofuran is added dropwise. The reaction mixture is stirred at room temperature overnight, refluxed three hours, cooled again and 17 ml. saturated ammonium chloride solution is added dropwise. The resulting precipitate is removed by filtration and the solvent is removed in vacuo to yield a heavy syrup which is dissolved in 250 ml. dichloromethane and extracted four times with 150 ml. portion 5% hydrochloric acid. The hydrochloric acid extracts are combined and extracted once with 100 ml. ether and made alkaline with 20% potassium hydroxide. The alkaline solution is extracted three times with 200 ml. portions ether and the extracts combined and dried over potassium carbonate. The solvent is removed in vacuo, and the remaining residue distilled to yield 6-[3-(N-methyl-N-benzylamino)-1-propyl]morphanthridine, B.P. 200–250° C./.02 mm.

6-(3-N-methyl-N-benzylamino-1-propyl)morphantridine hydrogen oxalate

The salt is prepared from alcohol solutions of the base and oxalic acid, and recrystallized from methyl alcohol, M.P. 189–191°.

Analysis.—Calcd. for $C_{27}H_{27}N_2O_4$ (percent): C, 72.96; H, 6.35; N, 6.32. Found (percent): C, 73.10; H, 6.51; N, 6.32.

EXAMPLE IV

6-[3-(N-methyl-N-carboethoxyamino)propyl]morphanthridine

Ethyl chloroformate (8.32 g., .075 mole) is added dropwise to a solution of 22.8 g. (.064 mole) of 6-(3-N-methyl-N-benzylamino)-propylmorphanthridine in 50 ml. of benzene at room temperature. The solution is refluxed for 18 hours after which it is steam distilled until the distillate contains no odor of benzylchloride. The residue is dissolved in 200 ml. benzene and extracted three times with 10% hydrochloric acid, washed with water, dried and taken to dryness in vacuo to yield a heavy syrup which is fractionated to yield the compound 6-[3-(N-methyl-N-carboethoxyamino)propyl]morphanthridine.

EXAMPLE V

6-[3-(N-methylamino)-1-propyl]morphanthridine

The crude 6 - [3-(N-methyl-N-carboethoxyamino)-propyl]morphanthridine obtained in Example IV is added to 100 ml. ethylene glycol and 6.41 g. (0.02 mole) barium hydroxide and refluxed for 8 hours, after which it is poured into 100 ml. water and filtered. The collected solids are washed thoroughly with benzene which is combined with benzene extractions of the filtrate and extracted with 10% hydrochloric acid. The aqueous solution is extracted with ethyl ether, made basic with 40% potassium hydroxide and extracted again with ethyl ether. The ether extracts are filtered, dried, and taken to dryness in vacuo to yield a heavy syrup which is fractionated to yield 6 - [3-(N-methylamino)-1-propyl]morphanthridine, B.P. 190° (1.5 mm.).

We claim:

1. A compound selected from compounds and pharmaceutically acceptable salts of compounds of the formula

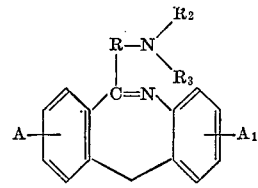

wherein A and $A_1$ are members selected from hydrogen, halogen, lower alkoxy, lower alkyl, lower alkylthio and trifluoromethyl, R is a lower alkylene and $R_2$ and $R_3$ are selected from hydrogen, lower alkyl and phenyl-lower alkyl.

2. A compound of claim 1 in which R is propylene.

3. A compound of claim 1 in which $R_2$ and $R_3$ are methyl.

4. A compound of claim 1 in which $R_2$ is benzyl and $R_3$ is methyl.

5. A compound of claim 1 in which $R_2$ is hydrogen and $R_3$ is methyl.

References Cited

Wander: Derwent Pharmaceuticals Documentation Specification Book No. 320, Specification 15,201, S. African Prov. 64/2568, published Dec. 15, 1964, 10 pages.

Weygand: Organic Preparations (New York, 1945), pp. 355–356 and 368.

AITON D. ROLLINS, Primary Examiner

U.S. Cl. X.R.

260—239.3, 247.1, 247.5, 268, 288, 293, 293.4, 294.7, 326.5, 326.81, 999; 424—244